Feb. 23, 1954 H. CHIREIX 2,670,404

MULTICHANNEL RADIOELECTRIC COMMUNICATION SYSTEM

Filed Nov. 24, 1950 2 Sheets-Sheet 1

Inventor
Henri Chireix
By Mudsell [illegible]

Feb. 23, 1954 H. CHIREIX 2,670,404

MULTICHANNEL RADIOELECTRIC COMMUNICATION SYSTEM

Filed Nov. 24, 1950 2 Sheets-Sheet 2

Inventor
Henri Chireix
By [illegible]

Patented Feb. 23, 1954

2,670,404

UNITED STATES PATENT OFFICE 2,670,404

MULTICHANNEL RADIOELECTRIC COMMUNICATION SYSTEM

Henri Chireix, Paris, France, assignor to Societe Francaise Radio-Electrique, a corporation of France Application November 24, 1950, Serial No. 197,205

Claims priority, application France December 2, 1949

8 Claims. (Cl. 179—15)

Figure 1:
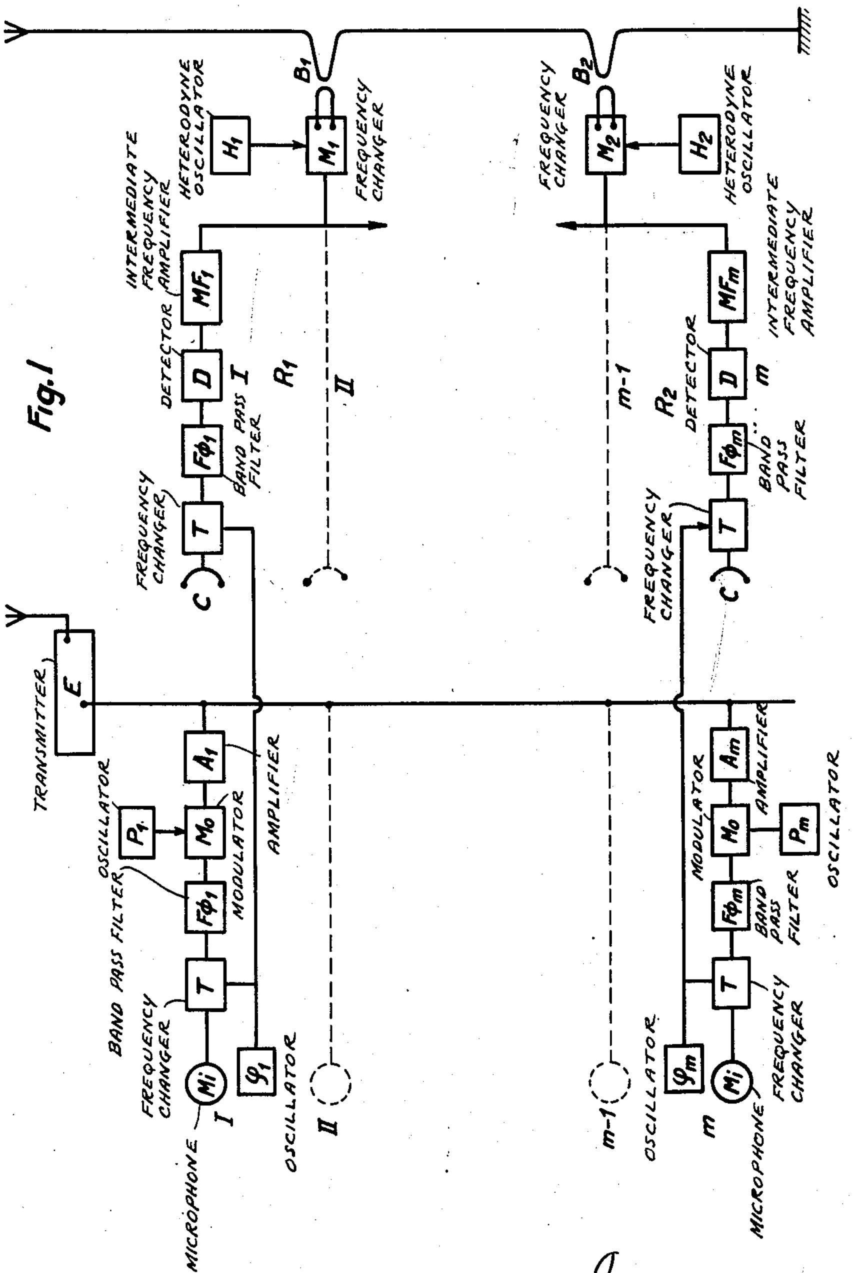

The object of the present invention is the solution of the following problem:

A certain number of arbitrarily placed stations, operating on ultra short waves and forming a network, have to simultaneously exchange between themselves a certain number of communications of a varied nature corresponding to different "services" or channels, each one characterized by a wave having an ultra-high frequency.

These communications are mostly telephone conversations but may also be of another nature (e. g. telegraphy, facsimile etc.)

It is on the other hand desired that the width of the band occupied by the network is the smallest possible and it is agreed that several transmitters will never function in the same channel.

Several transmitters may however operate simultaneously but in different channels and therefore a transmitter operating in a certain number of channels influences the local receiver listening in on other channels.

The problem to be solved is therefore different from that where a single multiplex connection is provided between two fixed stations and this latter problem has already been dealt with in French Patent No. 932,420 filed August 20, 1946.

The object of the present invention is the preceding to afford a more complete solution of the problem mentioned hereinabove.

It is obvious that difficulties arise at the reception of a channel subject to violent interferences due to local emissions in other channels. As the aerials should be non-directional so that the network can spread in all directions it is not possible to uncouple the receiving and transmitting aerials, to a great extent in a station and the electric field due to local interference may exceed by 80 decibels or more the useful field for receiving the distant stations. Further, since the emissions of different channels are comprised in a restricted frequency interval, that is to say, a relatively narrow band for all the channels, it cannot be expected to attain directly by the use of ultra-high frequency a selectivity sufficient for excluding local interference.

It is therefore necessary at the receiving end to change the frequency so as to lower the frequency of the whole of the channels in such a way as to obtain a much greater relative band width, allowing a selection at the intermediate frequency.

Nevertheless, due to non linear distortion phenomena the two following troublesome effects are produced:

(1.) An intermodulation effect mixing the modulation of one or several interfering signals with the signal to be received.

(2.) The creation of parasitic frequencies in the occupied band as soon as two or more local signals interfere with one another.

Finally if, as it is recommended in the patent heretofore mentioned, the different emitted waves corresponding to the different channels are produced by intermediate frequencies transposed in groups in the ultra-high frequency spectrum according to the technique if single band transmitters, the same causes of non linearity are found at the emission where in addition the propagated waves are effected with transmodulations by parasitic waves of smaller amplitude in the interior of the occupied band.

According to the patent heretofore mentioned the effects of intermodulation are avoided by providing different modulation frequencies for the different channels. To this end, the different channels are modulated by speech currents transposed in the different spectrums according to the technique of carrier currents. This has the result that at the receiving end after amplification and detection of the intermediate frequency corresponding to this channel, the transmodulation can be eliminated in the band filter corresponding to the transposition frequency of said channel.

This is supplemented according to the present invention by means having principally the second point for its object, that is to say the parasitic waves affecting the band, and their harmful effect.

The parasitic waves affecting the band are reduced as to their level and the number of those parasitic waves that can have a harmful character.

Their harmful effect can be reduced by arranging the channels in the occupied band according to well known laws.

Consider a non linear characteristic of the form:

$$y=ax+bx^2+cx^3+dx^4+ex^5 \quad (1)$$

This characteristic can be the current characteristic as a function of the voltage of an amplifying or a frequency changing tube.

In the latter case it is easy to see that a linear characteristic leads to a "linear" frequency changing characteristic when the heterodyne of large amplitude converts the region where the current is zero to the region where a finite current exists, and that the signal to be converted in frequency is superposed thereto. The expression "linear" frequency changing signifies therefore that in the case of several applied signals no combinations are formed that are due to these signals.

In the case of several sinusoidal signals of different frequencies X will have the form:

$$X_1+X_2+X_3+\ldots$$

and it results that for a term such as $X^p$, "$y$" contains components of frequencies such as:

$$\pm rf_1 \pm sf_2 \pm tf_3 \text{ subject to the condition } r+s+t=p$$

If all the signals are grouped in a relatively narrow part of the band, the terms of even power are incapable of causing parasitic frequencies within the useful band, the resultant frequencies being either considerably above or considerably below the useful band.

The characteristic to be considered becomes therefore:

$$y=ax+cx^3+ex^5+\ldots \text{ (odd terms)} \quad (2)$$

If the relative width of the band is not narrow certain terms of even power should be considered. In particular if the development of the expression is limited to five terms, (1) can be replaced by (2) if $$\frac{f_{max}}{f_{min}}<3/2$$

($f_{max}$ and $f_{min}$ being the maximum and minimum frequencies.

The two relations resulting into the suppression of the effects of the term $dx^4$ are:

$$3f_{min}-f_{max}>f_{max} \text{ and } 2f_{max}-2f_{min}<f_{min}$$

If these relations are satisfied the effect of the term $bx^2$ can also be neglected due to the fact that it leads to the easier condition $$\frac{f_{max}}{f_{min}}<2$$

It is therefore essential that this first condition is satisfied with respect to the intermediate frequencies occurring in emission if the ultra-high frequency transmitter is of the single band kind.

Furthermore it is necessary that the combinations due to the term $ex^5$ and the following terms are negligible.

It is seen that without regard to the magnitude of the coefficients, these terms decrease very rapidly when the levels diminish, so that a reduction of 10 decibels of the general level involves a level reduction of 50 decibels for the term $ex^5$ while the reduction is 10 decibels only for the useful term $ax$.

Therefore it is seen that the combinations due to the term $ex^5$ and a portion to the following terms can be rendered absolutely negligible by adoption of the system of amplitude modulation consisting in only keeping one side band and attenuating the carrier. This is rendered possible due to the fact that the modulations are transposed in frequency and that consequently the side bands are situated sufficiently distant from the carriers. A carrier reduction of the order of 10 decibels leads for the terms $ex^5$ to a reduction of parasitic waves due to beats between carriers by 50 decibels; however, in principle no reduction of beats of side bands between one another is amplified. But for these beats the average percentage of modulation of the different channels at a given moment must be taken into account and it is sufficient that this average percentage is itself 10 decibels lower than the maximum rate in order to obtain the same advantage. The transmission method consisting in keeping on each of the channels a reduced carrier and only one side band is therefore very important for reducing the level of parasitic waves and the number of those which are significant, on account of the much more rapid convergence of the series represented by Equation 1.

It results from these considerations that Equation 1 can be transformed into $$y=ax+cx^3 \quad (3)$$

$ax$ being the useful term and $cx$ the harmful term.

The different channels are distributed in the occupied band in such a way that the parasitic frequencies due to combinations introduced by this term differ at least by a unit frequency difference from any of the useful frequencies. They can then be entirely eliminated due to the selectivity of the intermediate frequency stages of the receivers.

The undesirable frequencies created by the term $cx^3$ can result from the interference of any two interfering channels which give rise to frequencies $2f_2 \pm f_1$. If all the frequencies are comprised in a restricted band that is to say if the relative width of the band is small, only the frequencies $2f_2-f_1$ need be considered as these alone give a frequency in the band or in the neighbourhood thereof.

For a multiplex of $m$ channels the number of these undesirable frequencies is $m(m-1)$ as each channel can be associated with the $(m-1)$ other channels, $m$ being the total number of channels.

The spectrum occupied by these undesirable frequencies extends from $f_{min}-(f_{max}-f_{min})$ to $f_{max}+(f_{max}-f_{min})$ therefore it verifies a band width equal to $3(f_{max}-f_{min})=3\Delta f$; $f_{max}$ and $f_{min}$ denoting the maximum and minimum frequencies, respectively, and $\Delta f$ the useful band. Thus, the spectrum occupied by these $m$ $(m-1)$ waves spreads over three times the useful band.

Undesirable frequencies can also result from the interference of three channels with one another. The number of possible combinations is that of objects taken in sets of 3 among $m$ objects, therefore $$m\frac{(m-1)(m-2)}{6}$$

Furthermore, with each combination the parasitic frequencies $\pm f_1 \pm f_2 \pm f_3$ can be associated. If however, only the frequencies falling into the band or its vicinity are considered, the frequencies to be associated with each combination are $$(f_1+f_2-f_3),(f_2+f_3-f_1),(f_3+f_1-f_2)$$

The number of parasitic frequencies is therefore $$m\frac{(m-1)(m-2)}{2}$$

This number of combinations of three frequencies is larger than the number of combinations of two frequencies when $m$ is larger than 4.

Nevertheless, all these combinations give rise to frequencies which are partly identical.

The problem consists therefore in distributing judiciously the different channels in the occupied band in such a way that the parasitic frequencies never consider with the position of a channel. This means to determine the frequency distances between consecutive channels, the sum of all these frequency distances corresponding to the total band.

It is convenient to define a unit of frequency difference termed hereinafter the predetermined frequency difference. If the frequency distance between any two consecutive channels is an integral multiple of this predetermined frequency difference, the total band will also be a multiple of this predetermined frequency difference. The different channels can be defined by numbers which will be integers and if the number of the first channel is zero, the number of the last one will be S, S being an integer representing the sum of all the frequency distances. The total useful band will thus be defined by $S+1$ and divided into S equal intervals.

Furthermore, the parasitic frequencies given by additions or subtractions of numbers coincide exactly with one or the other of the integers. They therefore coincide exactly with a channel or differ from the same by one or more predetermined frequency differences.

In order to avoid interference frequencies falling on a non occupied channel, the frequency distances between two successive channels must be different multiples of the predetermined frequency difference and S must be sufficiently high so that the parasitic frequencies can find their place at the numbers unoccupied by the channels. It is obviously preferable to make S as small as possible in order to obtain for a given total band the largest possible predetermined frequency difference.

In fact, as has been mentioned heretofore the combinations are not all distinct and it is noted that combination of two frequencies add practically no new number to combinations of three frequencies, a certain number of which are, by the way, common. Further, all these combinations are more or less uniformly distributed between the value $-S$ and the value $+2S$, that is to say in the interval $3\Delta f$ so that the number of combinations in the interval of 0 to S is practically at the utmost equal to $$m\frac{(m-1)(m-2)}{6}$$

Therefore, the value S (multiple of $m-1$) must therefore be at least of the order of $$m\frac{(m-1)(m-2)}{6}+(m-1)$$

in order to reserve the free numbers corresponding to the channels.

If the number of not distinct combinations is increased, it will be sufficient to choose S, an integral multiple of $(m-1)$, near to $$m\frac{(m-1)(m-2)}{6}$$

Eight channels therefore lead to $S=63$ or $S=56$.

It can be verified that $S=56$ suffices with the distribution of the seven distances according to the numbers 5—7—9—11—6—8—10.

A multiplex of six channels leads to $S=25$ or $S=20$. It can be verified that $S=20$ is insufficient (not enough not distinct interferences) and that it is advisable to take the distribution 3—5—7—6—4 giving $S=25$.

If $p$ designates the smallest frequency distance between channels (expressed as function of the predetermined frequency difference) the largest distance between channels can be $$p+(m-2)$$

and the sum of the frequency distances is:

$$(m-1)p+\frac{(m-1)(m-2)}{2}=S=(m-1)\left[p+\frac{m}{2}-1\right]$$

Taking into account the two values of S heretofore defined $p$ is equal to the integer equal to or immediately following:

$$\frac{(m-2)(m-3)}{6}$$

or this integer augmented by a unit.

Thus for: $m=8$ $p$ is found to equal 5 or 6, and 5 is in fact sufficient; $m=6$ $p$ is found to equal 2 or 3, and in fact 3 should be chosen.

For $m=12$ $p$ is found to equal 15 or 16, if 15 is adopted, the smallest frequency distance is 15 times the predetermined frequency difference and the largest frequency distance equals 25 times the predetermined frequency difference.

The occupied band will have a width being 220 times the predetermined frequency difference.

The order in which the different frequency distances should be taken seems rather arbitrary.

Therefore a law has been established for the distribution of channels in the occupied band i. e. for the frequency distances between successive channels as different integer numbers, the smallest and the largest of which determined by the number of channels, all the integer numbers comprised between these two limits being utilized, this new distribution having as an object the rejecting of interferences the amplitude of which cannot be neglected.

In these conditions the parasitic frequencies of non negligible amplitude can be very much weakened at the reception in the intermediate frequency stages of the receivers by the selectivity thereof.

It is to be noted that according to the arrangement provided in the patent heretofore mentioned and consisting in having different frequency modulations for different channels, their amplitude after intermediate frequency amplifying stages can remain high without inconvenience for the operation.

According to an arrangement being different from that of the patent heretofore mentioned, it is preferred to use two receivers at reception, fed by the same aerial, each of the receivers receiving a half or about a half of the channels.

These receivers are of the simple superheterodyne kind and comprise under exclusion of the high frequency amplifying stage, a mixer discharging into $m/2$ intermediate frequency amplifiers regulated so as to operate on different intermediate frequencies.

The first receiver receives the lower frequencies and is provided with a local oscillator which oscillates at a frequency below the lowest frequency to be received and conversely the second receiver receiving the higher frequencies is provided with a local oscillator which oscillates at a frequency which is higher than the highest frequency to be received.

It is therefore advisable to fix the value of the lowest of the intermediate frequencies at reception for the one or the other of the receivers, these frequencies corresponding to the first and last channel, respectively, the other intermediate frequencies resulting for the one or other of the receivers of this lowest value.

In noting that the parasitic waves of significant amplitude cover the band $3\Delta f$ or the values of $-S$ to $+2S$ it is necessary to avoid that parasitics at $-S$ or $+2S$ have frequencies coincident with the intermediate frequencies corresponding to the values of the channels.

It will be necessary to this effect that the heterodynes are situated at more distant values than $$0-\frac{S}{2}$$

and $$S+\frac{S}{2}$$

By placing them at values $$0-\frac{S+1}{2}$$

and $$S+\frac{S+1}{2}$$

a protection against the parasitic waves is accomplished consisting to a frequency interval equal to the predetermined frequency difference, at the same time preserving the lowest compatible intermediate frequencies. This means placing the value of the first intermediate frequency at half the frequency of the useful band augmented by the predetermined frequency difference.

It has not yet been stated herein whether the nominal frequencies of the channels correspond to the weakened carriers or to the retained side bands. It is preferable that these correspond to the retained side bands.

On the other band it is obvious that the intermediate frequencies of the receivers should have such a selectivity curve that the carrier waves reduced at the emission with respect to the retained side band are on the contrary increased with respect to latter at the reception.

There is hereafter described a non limitative example of an embodiment comprising 6 channels.

All the elements being known per se, a single line schematic will be sufficient for the understanding (Fig. 1).

Each channel comprises at the emission a microphone $M_i$, a frequency transposition stage T fed by an oscillator $\varphi$ regulated to the transposition frequency of the channel, and a band filter F covering the range of the transposed frequencies, $\varphi$. The transposed currents flow to a modulator $M_0$ to which is also applied an oscillator P regulated to the intermediate carrier frequency corresponding to this channel; the currents of the carrier P modulated in amplitude are amplified by stage A having a response curve as function of the frequency being such that the carrier is attenuated with respect to the side maintained band (circuits tuned to the side band).

The different channels are identically equipped but the oscillators $\varphi$ and P produce frequencies having different values, and the band filters F allow $\varphi$ different bands to pass, hence their designation by a subscript.

The mixing of the different channels is effected at the output of the amplifiers A and the spectrum thus constituted is applied to a single band transmitter E which transposes it to ultra-high frequencies, for example 300 to 400 mc., only the upper band being kept.

Only the first and last channel is shown in solid lines. For 6 channels the values of $\varphi_1$ to $\varphi_6$ can be 80—84—88—92—96—100 kilocycles and the values of $(P_1+\varphi_1)$ $(P_2+\varphi_2)$ etc. (upper band being kept) are between 15.5 and 23 megacycles with successive frequency distances similar to the numbers 3—5—7—6—4. The predetermined frequency differences is therefore 300 kilocycles and the occupied band 7.5 megacycles. It should be noted that the ratio $$\frac{P_m}{P_1}=\frac{23}{15.5}$$

is less than 3/2.

The aerial, or more exactly the aerial feeder operates by the coupling loops or better across the "tuned pots" the frequency chargers $M_1$ and $M_2$ operated themselves by heterodynes $H_1$ and $H_2$.

The receiver $R_1$ associated with $H_1$ and $M_1$ is destined for the reception of the three channels having lowest frequency, therefore here the channels I, II, III and the receiver $R_2$ associated with $H_2$ and $M_2$ the three channels having the highest frequencies.

The output of $M_1$ feeds the three intermediate frequency amplifiers $MF_1$, $MF_2$, $MF_3$ and the output of $M_2$ the three remaining amplifiers. In each channel there is this the amplifier MF assuring the amplification and the selection and the detector D. The detected currents are then filtered in filters $F\varphi$ identical with those of the emission and finally speech is re-established clearly by subjecting it in T to the same transposition as at the emission. Finally it is received in the head gear C.

According to what has been said hereinabove the lowest of the intermediate frequencies admissible at the reception should be at least equal to half the frequency of the occupied band augmented by the predetermined frequency difference, therefore 3.9 megacycles. The other intermediate frequencies are deduced from that and will be respectively 4.8 and 6.3 for one receiver and 5.1 and 6.9 mc. for the other. These values correspond to the side bands transmitted effectively.

It is seen that according to this concept it is sufficient to change the frequencies of the quartz crystals of the transmitter E and also those of the crystals of the heterodynes $H_1$ and $H_2$, in order to change the operating waves, it is then sufficient to retune the ultra-high frequency circuits only to the new waves.

Figure 2:
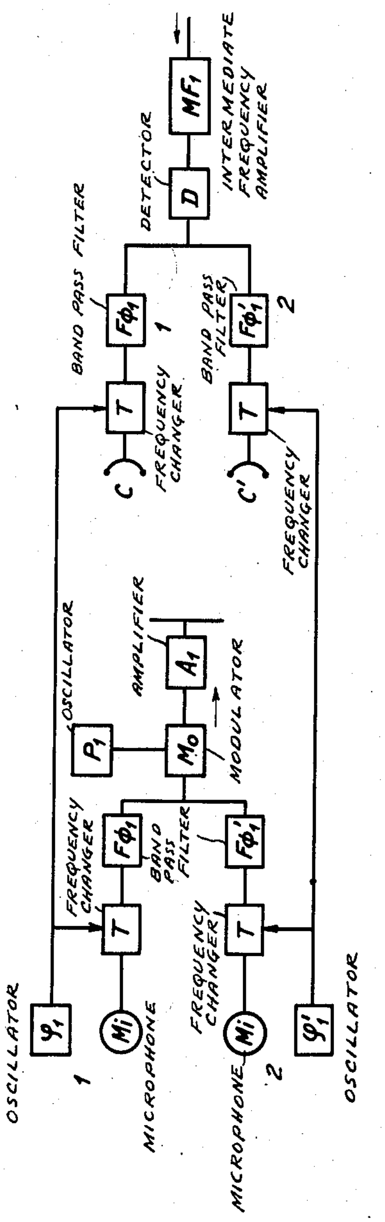

With the restriction heretofore mentioned that several transmitters never function on the same channel the capacity of the network can be increased by subdividing the channels into two channels according to the arrangement represented in Fig. 2 which shows the equipment of one channel for emission and reception.

At emission the modulator $M_0$ receiving the carrier wave $P_1$, if it relates to channel I, is operated by transposed speech currents from band filters $F\varphi_1$ and $F\varphi'_1$ established for neighbouring transposition frequencies $\varphi_1$ and $\varphi'_1$.

At reception the detector D feeds in parallel band filters $F\varphi_1$ and $F\varphi'_1$ and speech is clearly re-constituted by transposition by means of frequencies $\varphi_1$ and $\varphi'_1$. For the doubled channel I transposition frequencies $\varphi_1$ and $\varphi'_1$. 76 and 80 kilocycles.

According to this modification each channel represents in fact a two channel multiplex with frequency subdivision and no supplementary cause for interference is introduced as a consequence, only the modulation spectrum of the channel being doubled.

I claim:

1. A multichannel radio-electrical communication system having a plurality of stations operating with ultra-short waves, each of said stations comprising, in combination, means for transforming voice frequency signals into audio frequency bands associated, respectively, with the channels of the communication system; a plurality of sources of intermediate frequency associated, respectively, with the channels of the communication system, said intermediate frequencies differing by amounts being different from one another and being integral multiples of a predetermined frequency difference; means for amplitude-modulating said intermediate frequencies associated, respectively, with the channels, respectively, by said voice frequency bands associated with the channels so as to obtain intermediate frequencies and two side bands for each of said intermediate frequencies; means for suppressing one of said side bands of each intermediate frequency and attenuating said intermediate frequencies so as to retain the other of said side bands of said intermediate frequencies, said retained side bands associated with the channels of the communication system being, respectively, separated from one another by amounts differing from one another, the smallest of said amounts being equal to the product of said predetermined frequency difference and an integer being equal to one of $$\frac{(m-2)(m-3)}{6}$$

and $$\frac{(m-2)(m-3)}{6}+1$$

$m$ being the total number of channels of the communication system, the largest of said amounts being equal to the product of said predetermined frequency difference and said integer augmented by $(m-2)$; a single ultra-high frequency transmitter operating with one side band only; means for amplitude-modulating said single ultra-high frequency transmitter by a combination of said retained side bands and said attenuated intermediate frequencies; a first receiver; a second receiver, each of said receivers serving for receiving half the total number of the frequencies assigned, respectively, to the channels; a first local oscillator cooperating with said first receiver and generating a frequency lower than the lowest frequency to be received; a second local oscillator cooperating with said second receiver and generating a frequency higher than the highest frequency to be received; means for mixing said frequencies generated by said first and second oscillators with said frequencies received, respectively, by said first and second receivers so as to generate a first intermediate frequency and a second intermediate frequency; means for amplifying said first and second intermediate frequencies; and means for demodulating said amplified first and second intermediate frequencies so as to obtain two oscillations having frequencies differing from each other by a quantity equal to said predetermined frequency difference.

2. A multichannel radio-electrical communication system having a plurality of stations operating with ultra-short waves, each of said stations comprising, in combination, means for transforming voice frequency signals into audio frequency bands associated, respectively, with the channels of the communication system; a plurality of sources of intermediate frequency associated, respectively, with the channels of the communication system, said intermediate frequencies differing by amounts being different from one another and being integral multiples of a predetermined frequency difference; means for amplitude-modulating said intermediate frequencies associated, respectively, with the channels, respectively, by said voice frequency bands associated with the channels so as to obtain intermediate frequencies and two side bands for each of said intermediate frequencies; means for suppressing one of said side bands of each intermediate frequency and attenuating said intermediate frequencies so as to retain the other of said side bands of said intermediate frequencies, said retained side bands associated with the channels of the communication system being, respectively, separated from one another by amounts differing from one another, the smallest of said amounts being equal to the product of said predetermined frequency difference and an integer being equal to one of $$\frac{(m-2)(m-3)}{6}$$

and $$\frac{(m-2)(m-3)}{6}+1$$

$m$ being the total number of channels of the communication system, the largest of said amounts being equal to the product of said predetermined frequency difference and said integer augmented by $(m-2)$, the integral multiples of said predetermined frequency difference lying between said smallest and largest of said amounts being assigned in any order to the intermediate channels of the communication system; a single ultra-high frequency transmitter operating with one side band only; means for amplitude-modulating said single ultra-high frequency transmitter by a combination of said retained side bands and said attenuated intermediate frequencies; a first receiver; a second receiver, each of said receivers serving for receiving half the total number of the frequencies assigned, respectively, to the channels; a first local oscillator cooperating with said first receiver and generating a frequency lower than the lowest frequency to be received; a second local oscillator cooperating with said second receiver and generating a frequency higher than the highest frequency to be received; means for mixing said frequencies generated by said first and second oscillators with said frequencies received, respectively, by said first and second receivers so as to generate a first intermediate frequency and a second intermediate frequency; means for amplifying said first and second intermediate frequencies; and means for demodulating said amplified first and second intermediate frequencies so as to obtain two oscillations having frequencies differing from each other by a quantity equal to said predetermined frequency difference.

3. A multichannel radio-electrical communication system having a plurality of stations operating with ultra-short waves, each of said stations comprising, in combination, means for transforming voice frequency signals into audio frequency bands associated, respectively, with the channels of the communication system; a plurality of sources of intermediate frequency associated, respectively, with the channels of the communication system, said intermediate frequencies differing by amounts being different from one another and being integral multiples of a predetermined frequency difference; means for amplitude-modulating said intermediate frequencies associated, respectively, with the channels, respectively, by said voice frequency bands associated with the channels so as to obtain intermediate frequencies and two side bands for each of said intermediate frequencies; means for suppressing one of said side bands of each intermediate frequency and attenuating said intermediate frequencies so as to retain the other of said side bands of said intermediate frequencies, said retained side bands associated with the channels of the communication system being, respectively, separated from one another by amounts differing from one another, the smallest of said amounts being equal to the product of said predetermined frequency difference and an integer being equal to one of $$\frac{(m-2)(m-3)}{6}$$

and $$\frac{(m-2)(m-3)}{6}+1$$

$m$ being the total number of channels of the communication system, the largest of said amounts being equal to the product of said predetermined frequency difference and said integer augmented by $(m-2)$; a single ultra-high frequency transmitter operating with one side band only; means for amplitude-modulating said single ultra-high frequency transmitter by a combination of said retained side bands and said attenuated intermediate frequencies; a first superheterodyne receiver; a second superheterodyne receiver, each of said receivers serving for receiving half the total number of the frequencies assigned, respectively, to the channels; a first local oscillator cooperating with said first receiver and generating a frequency lower than the lowest frequency to be received; a second local oscillator cooperating with said second receiver and generating a frequency higher than the highest frequency to be received; means for mixing said frequencies generated by said first and second oscillators with said frequencies received, respectively, by said first and second receivers so as to generate a first intermediate frequency and a second intermediate frequency; means for amplifying said first and second intermediate frequencies; and means for demodulating said amplified first and second intermediate frequencies so as to obtain two oscillations having frequencies differing from each other by a quantity equal to said predetermined frequency difference.

4. A multichannel radio-electrical communication system having a plurality of stations operating with ultra-short waves, each of said stations comprising, in combination, means for transforming voice frequency signals into audio frequency bands associated, respectively, with the channels of the communication system; a plurality of sources of intermediate frequency associated, respectively, with the channels of the communication system, said intermediate frequencies differing by amounts being different from one another and being integral multiples of a predetermined frequency difference; means for amplitude-modulating said intermediate frequencies associated, respectively, with the channels, respectively, by said voice frequency bands associated with the channels so as to obtain intermediate frequencies and two side bands for each of said intermediate frequencies; means for suppressing one of said side bands of each intermediate frequency and attenuating said intermediate frequencies so as to retain the other of said side bands of said intermediate frequencies, said retained side bands associated with the channels of the communication system being, respectively, separated from one another by amounts differing from one another, the smallest of said amounts being equal to the product of said predetermined frequency difference and an integer being equal to one of $$\frac{(m-2)(m-3)}{6}$$

and $$\frac{(m-2)(m-3)}{6}+1$$

$m$ being the total number of channels of the communication system, the largest of said amounts being equal to the product of said predetermined frequency difference and said integer augmented by $(m-2)$, the integral multiples of said predetermined frequency difference lying between said smallest and largest of said amounts being assigned in any order to the intermediate channels of the communication system; a single ultra-high frequency transmitter operating with one side band only; means for amplitude-modulating said single ultra-high frequency transmitter by a combination of said retained side bands and said attenuated intermediate frequencies; a first superheterodyne receiver; a second superheterodyne receiver, each of said receivers serving for receiving half the total number of the frequencies assigned, respectively, to the channels; a first local oscillator cooperating with said first receiver and generating a frequency lower than the lowest frequency to be received; a second local oscillator cooperating with said second receiver and generating a frequency higher than the highest frequency to be received; means for mixing said frequencies generated by said first and second oscillators with said frequencies received, respectively, by said first and second receivers so as to generate a first intermediate frequency and a second intermediate frequency; means for amplifying said first and second intermediate frequencies; and means for demodulating said amplified first and second intermediate frequencies so as to obtain two oscillations having frequencies differing from each other by a quantity equal to said predetermined frequency difference.

5. A multichannel radio-electrical communication system having a plurality of stations operating with ultra-short waves, each of said stations comprising, in combination, means for transforming voice frequency signals into audio frequency bands associated, respectively, with the channels of the communication system; a plurality of sources of intermediate frequency associated, respectively, with the channels of the communication system, said intermediate frequencies differing by amounts being different from one another and being integral multiples of a predetermined frequency difference; means for amplitude-modulating said intermediate frequencies associated, respectively, with the channels, respectively, by said voice frequency bands associated with the channels so as to obtain intermediate frequencies and two side bands for each of said intermediate frequencies; means for suppressing one of said side bands of each intermediate frequency and attenuating said intermediate frequencies so as to retain the other of said side bands of said intermediate frequencies, said retained side bands associated with the channels of the communication system being, respectively, separated from one another by amounts differing from one another, the smallest of said amounts being equal to the product of said predetermined frequency difference and an integer being equal to one of $$\frac{(m-2)(m-3)}{6}$$

and $$\frac{(m-2)(m-3)}{6}+1$$

$m$ being the total number of channels of the combination system, the largest of said amounts being equal to the product of said predetermined frequency difference and said integer augmented by $(m-2)$; a single ultra-high frequency transmitter operating with one side band only; means for amplitude-modulating said single ultra-high frequency transmitter by a combination of said retained side bands and said attenuated intermediate frequencies; a first receiver; a second receiver, each of said receivers serving for receiving half the total number of the frequencies assigned, respectively, to the channels; a first local oscillator cooperating with said first receiver and generating a frequency lower than the lowest frequency to be received; a second local oscillator cooperating with said second receiver and generating a frequency higher than the highest frequency to be received; means for mixing said frequencies generated by said first and second oscillators with said frequencies received, respectively, by said first and second receivers so as to generate a first intermediate frequency and a second intermediate frequency, said first intermediate frequency being equal to half the occupied band width augmented by said predetermined frequency difference; means for amplifying said first and second intermediate frequencies; and means for demodulating said amplified first and second intermediate frequencies so as to obtain two oscillations having frequencies differing from each other by a quantity equal to said predetermined frequency difference.

6. A multichannel radio-electrical communication system having a plurality of stations operating with ultra-short waves, each of said stations comprising, in combination, means for transforming voice frequency signals into audio frequency bands associated, respectively, with the channels of the communication system; a plurality of sources of intermediate frequency associated, respectively, with the channels of the communication system, said intermediate frequencies differing by amounts being different from one another and being integral multiples of a predetermined frequency difference; means for amplitude-modulating said intermediate frequencies associated, respectively, with the channels, respectively, by said voice frequency bands associated with the channels so as to obtain intermediate frequencies and two side bands for each of said intermediate frequencies; means for suppressing one of said side bands of each intermediate frequency and attenuating said intermediate frequencies so as to retain the other of said side bands of said intermediate frequencies, said retained side bands associated with the channels of the communication system being, respectively, separated from one another by amounts differing from one another, the smallest of said amounts being equal to the product of said predetermined frequency difference and an integer being equal to one of $$\frac{(m-2)(m-3)}{6}$$

and $$\frac{(m-2)(m-3)}{6}+1$$

$m$ being the total number of channels of the communication system, the largest of said amounts being equal to the product of said predetermined frequency difference and said integer augmented by $(m-2)$, the integral multiples of said predetermined frequency difference lying between said smallest and largest of said amounts being assigned in any order to the intermediate channels of the communication system; a single ultra-high frequency transmitter operating with one side band only; means for amplitude-modulating said single ultra-high frequency transmitter by a combination of said retained side bands and said attenuated intermediate frequencies; a first receiver; a second receiver, each of said receivers serving for receiving half the total number of the frequencies assigned, respectively, to the channels; a first local oscillator cooperating with said first receiver and generating a frequency lower than the lowest frequency to be received; a second local oscillator cooperating with said second receiver and generating a frequency higher than the highest frequency to be received; means for mixing said frequencies generated by said first and second oscillators with said frequencies received, respectively, by said first and second receivers so as to generate a first intermediate frequency and a second intermediate frequency, said first intermediate frequency being equal to half the occupied band width augmented by said predetermined frequency difference; means for amplifying said first and second intermediate frequencies; and means for demodulating said amplified first and second intermediate frequencies so as to obtain two oscillations having frequencies differing from each other by a quantity equal to said predetermined frequency difference.

7. A multichannel radio-electrical communication system having a plurality of stations operating with ultra-short waves, each of said stations comprising, in combination, means for transforming voice frequency signals into audio frequency bands associated, respectively, with the channels of the communication system; a plurality of sources of intermediate frequency associated, respectively, with the channels of the communication system, said intermediate frequencies differing by amounts being different from one another and being integral multiples of a predetermined frequency difference; means for amplitude-modulating said intermediate frequencies associated, respectively, with the channels, respectively, by said voice frequency bands associated with the channels so as to obtain intermediate frequencies and two side bands for each of said intermediate frequencies; means for suppressing one of said side bands of each intermediate frequency and attenuating said intermediate frequencies so as to retain the other of said side bands of said intermediate frequencies, said retained side bands associated with the channels of the communication system being, respectively, separated from one another by amounts differing from one another, the smallest of said amounts being equal to the product of said predetermined frequency difference and an integer being equal to one of $$\frac{(m-2)(m-3)}{6}$$

and $$\frac{(m-2)(m-3)}{6}+1$$

$m$ being the total number of channels of the communication system, the largest of said amounts being equal to the product of said predetermined frequency difference and said integer augmented by $(m-2)$; a single ultra-high frequency transmitter operating with one side band only; means for amplitude-modulating said single ultra-high frequency transmitter by a combination of said retained side bands and said attenuated intermediate frequencies; a first superheterodyne receiver; a second superheterodyne receiver, each of said receivers serving for receiving half the total number of the frequencies assigned, respectively, to the channels; a first local oscillator cooperating with said first receiver and generating a frequency lower than the lowest frequency to be received; a second local oscillator cooperating with said second receiver and generating a frequency higher than the highest frequency to be received; means for mixing said frequencies generated by said first and second oscillators with said frequencies received, respectively, by said first and second receivers so as to generate a first intermediate frequency and a second intermediate frequency, said first intermediate frequency being equal to half the occupied band width augmented by said predetermined frequency difference; means for amplifying said first and second intermediate frequencies; and means for demodulating said amplified first and second intermediate frequencies so as to obtain two oscillations having frequencies differing from each other by a quantity equal to said predetermined frequency difference.

8. A multichannel radio-electrical communication system having a plurality of stations operating with ultra-short waves, each of said stations comprising, in combination, means for transforming voice frequency signals into audio frequency bands associated, respectively, with the channels of the communication system; a plurality of sources of intermediate frequency associated, respectively, with the channels of the communication system, said intermediate frequencies differing by amounts being different from one another and being integral multiples of a predetermined frequency difference; means for amplitude-modulating said intermediate frequencies associated, respectively, with the channels, respectively, by said voice frequency bands associated with the channels so as to obtain intermediate frequencies and two side bands for each of said intermediate frequencies; means for suppressing one of said side bands of each intermediate frequency and attenuating said intermediate frequencies so as to retain the other of said side bands of said intermediate frequencies, said retained side bands associated with the channels of the communication system being, respectively, separated from one another by amounts differing from one another, the smallest of said amounts being equal to the product of said predetermined frequency difference and an integer being equal to one of $$\frac{(m-2)(m-3)}{6}$$

and $$\frac{(m-2)(m-3)}{6}+1$$

$m$ being the total number of channels of the communication system, the largest of said amounts being equal to the product of said predetermined frequency difference and said integer augmented by $(m-2)$, the integral multiples of said predetermined frequency difference lying between said smallest and largest of said amounts being assigned in any order to the intermediate channels of the communication system; a single ultra-high frequency transmitter operating with one side band only; means for amplitude-modulating said single ultra-high frequency transmitter by a combination of said retained side bands and said attenuated intermediate frequencies; a first superheterodyne receiver; a second superheterodyne receiver, each of said receivers serving for receiving half the total number of the frequencies assigned, respectively, to the channels; a first local oscillator cooperating with said first receiver and generating a frequency lower than the lowest frequency to be received; a second local oscillator cooperating with said second receiver and generating a frequency higher than the highest frequency to be received; means for mixing said frequencies generated by said first and second oscillators with said frequencies received, respectively, by said first and second receivers so as to generate a first intermediate frequency and a second intermediate frequency, said first intermediate frequency being equal to half the occupied band width augmented by said predetermined frequency difference; means for amplifying said first and second intermediate frequencies; and means for demodulating said amplified first and second intermediate frequencies so as to obtain two oscillations having frequencies differing from each other by a quantity equal to said predetermined frequency difference.

HENRI CHIREIX.

References Cited in the file of this patent

UNITED STATES PATENTS

| Number | Name | Date |
|---|---|---|
| 1,361,488 | Osborne | Dec. 7, 1920 |
| 1,361,522 | Espenschied | Dec. 7, 1920 |
| 1,559,867 | Griggs | Nov. 3, 1925 |
| 1,641,431 | Horton | Sept. 6, 1927 |
| 2,284,706 | Wiessner et al. | June 2, 1942 |
| 2,298,409 | Peterson | Oct. 13, 1942 |